United States Patent

[11] 3,599,145

[72] Inventors Hironobu Ando
Kyoto;
Tamotu Sugimoto, Osaka, both of, Japan
[21] Appl. No. 748,246
[22] Filed July 29, 1968
[45] Patented Aug. 10, 1971
[73] Assignee Omron Tateisi Electronics Co.
Kyoto, Japan
[32] Priority Aug. 17, 1967
[33] Japan
[31] 42/52834

[54] SINGLE ELEMENT PLURAL LANE DETECTOR
5 Claims, 4 Drawing Figs.

[52] U.S. Cl. .................................................. 340/38 L
[51] Int. Cl. .................................................. G08g 1/01
[50] Field of Search .................................... 340/38 L

[56] References Cited
UNITED STATES PATENTS
3,312,935  4/1967  Brothman et al. ............. 340/38 L Primary Examiner—William C. Cooper
Attorney—Christensen, Sanborn & Matthews ABSTRACT: An apparatus for simultaneously detecting vehicles on a plurality of lanes of a street with a single detecting element. The single detecting element is dimensioned to extend across a plurality of lanes of a street and is included in an oscillating circuit, the frequency of which is changed by the presence of a vehicle within the field of the detecting element. When a first vehicle comes into the detecting field, an electrical signal corresponding to the change caused by the vehicle in the frequency is produced to indicate the detection of the first vehicle. At the same time, the value of the electrical signal is memorized. Under this condition, when a second vehicle is detected along with the first, a greater change occurs in the frequency and a corresponding electrical signal is produced. This signal is then compared with the memorized signal to produce an electrical signal corresponding to the difference therebetween, by which the detection of simultaneous presence of the two vehicles is indicated.

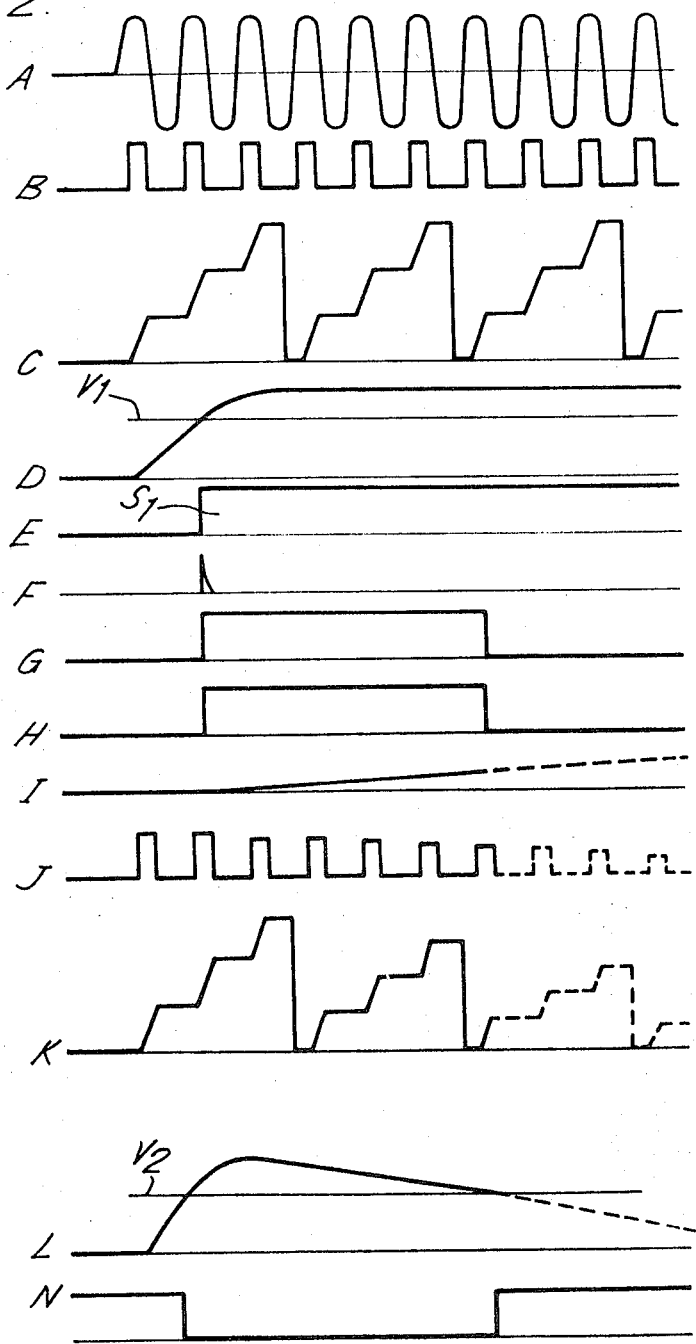

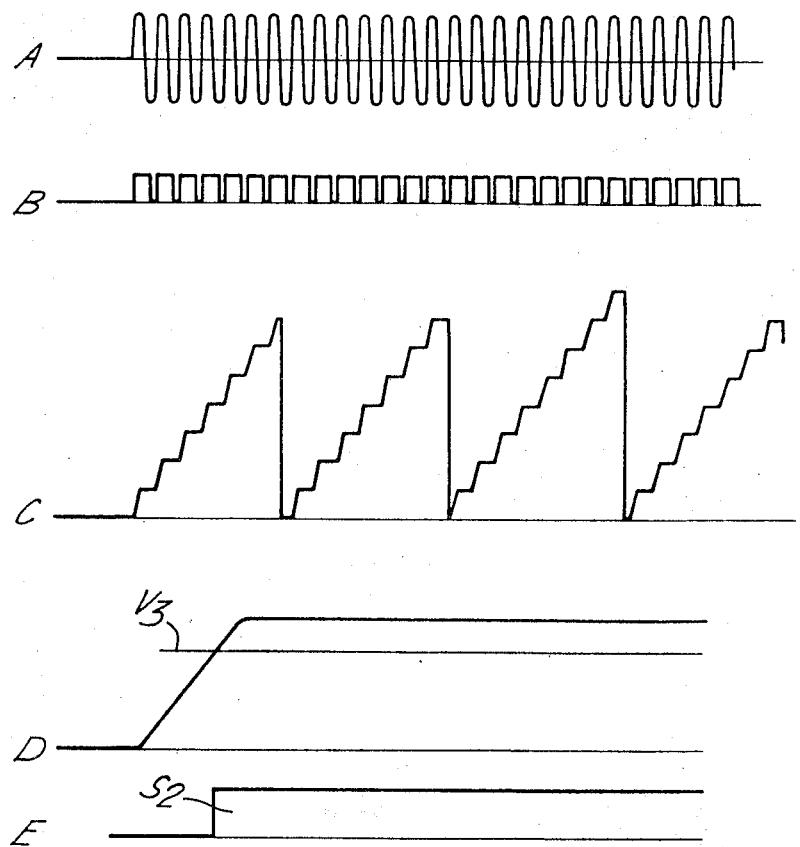

SINGLE ELEMENT PLURAL LANE DETECTOR

This invention relates to an apparatus for simultaneously detecting a plurality of vehicles on a plurality of lanes of a street.

To detect vehicles on a street, a vehicle detector is placed thereon for actuation by vehicles running on the street. In prior art vehicle detectors, however, a single detecting element or pickup can detect only one vehicle at a time. Therefore, if the street has a plurality of lanes, many detecting elements or pickups must be provided, one for each lane, with resulting complication of the structure of the detector and increase in its manufacturing cost.

Accordingly, it is the primary object of the invention to provide an apparatus for simultaneously detecting a plurality of vehicles by using a single detecting element. In accordance with the invention, the single detecting element is dimensioned to extend across the lanes and is sensitive to the presence of a vehicle within the field of the detecting element. When the presence of a first vehicle is sensed by the detecting element, a corresponding first electrical signal is produced, by which the detection of the vehicle is indicated. At the same time the value of the electrical signal is memorized. Under this condition, when a second vehicle is detected by the detecting element, a corresponding second electrical signal is produced. This second signal is then compared with the memorized signal, so that when the difference therebetween reaches a predetermined value, a corresponding signal is produced to indicate the coexistence of the two vehicles within the field of the detecting element.

The invention, with its features and advantages, will become more apparent from the following detailed description of a preferred embodiment thereof with reference to the accompanying drawings, wherein:

FIG. 2 shows the waveforms of the outputs produced by different components of the system of FIG. 1 when a first vehicle has been detected;

FIG. 3 shows the waveforms of the outputs produced by different components of the system of FIG. 1 when two vehicles have been simultaneously detected.

Figure 1:
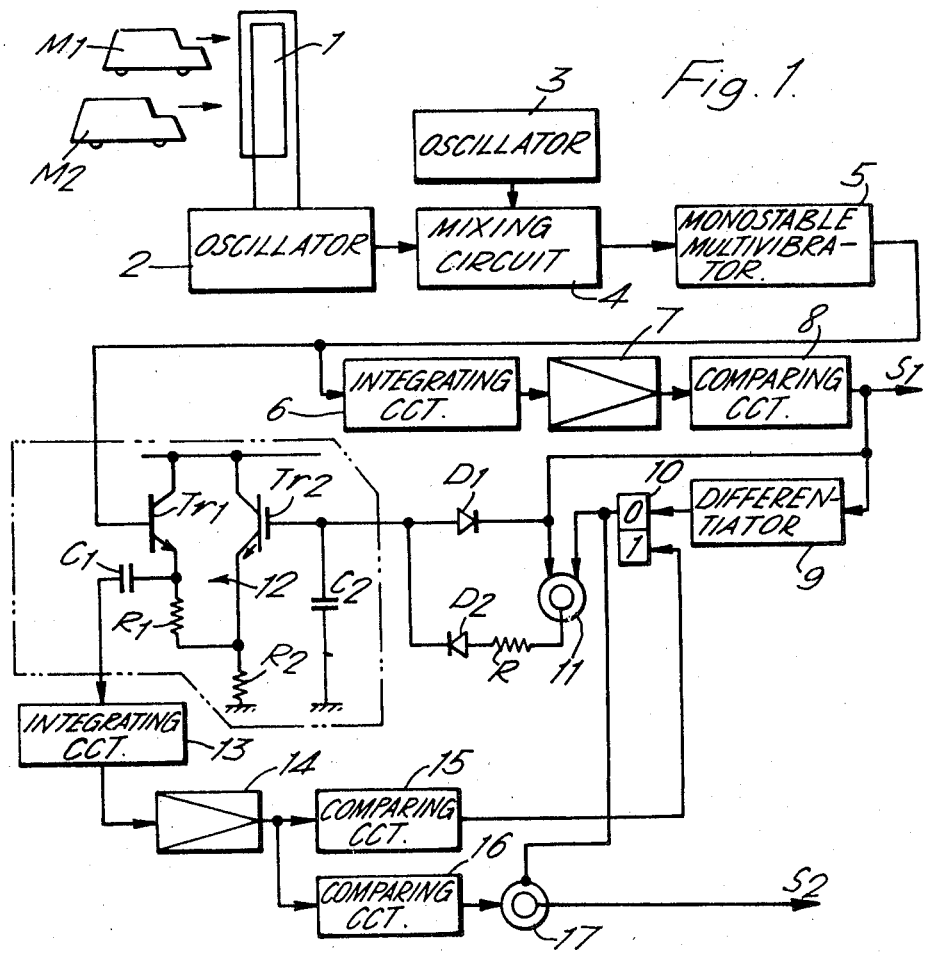
FIG. 1 is an electrical block diagram of one embodiment of the invention.

Referring now in detail to the drawings, first to FIG. 1, there is shown a vehicle detecting element 1 placed on a street for actuation by traffic passing thereover. The element 1 comprises an inductance coil extending across a plurality, say, two lanes of the street, so that two vehicles $M_1$ and $M_2$ can be detected at the same time. This coil 1 is a component part of an oscillator 2 so designed that when vehicles come into the field of the coil, the oscillating frequency of the oscillator changes. This frequency change is greater with two vehicles than it is with one vehicle in the field. It is here assumed that the oscillating frequency decreases as a vehicle comes into the field of the detecting coil 1. The oscillating frequency of the oscillator 2 is compared with a reference or standard oscillating frequency provided by a second oscillator 3. The comparison is made in a mixing circuit 4, which produces an output the frequency of which is the difference between the output frequencies of the two oscillators 2 and 3. It will be easily seen that upon entrance of a vehicle in the field of the coil 1, the output frequency of the mixing circuit 4 increases. The output from the circuit 4 triggers a monostable multivibrator 5, so that the latter produces output pulses of the same frequency as the output frequency of the mixing circuit 4.

Suppose that when the coil 1 detects a single vehicle, the output from the mixing circuit 4 is a first detection signal having the waveform shown in FIG. 2A, and the output from the multivibrator 5 will be of a waveform shown in FIG. 2B. The output pulses from the multivibrator 5 are applied to a first integrating circuit 6. This circuit 6 integrates the pulses from the multivibrator 5 for a predetermined period of time, after which it is reset and again starts integrating the pulses from the multivibrator 5. Every time the circuit 6 receives one pulse from the multivibrator 5, the output voltage of the circuit 6 increases by the amount corresponding to the amplitude of the pulse, as shown in FIG. 2C. The output from the integrating circuit 6 is determined by the frequency and amplitude of the output from the multivibrator 5. Therefore, if the amplitude is constant, the output of the circuit 6 is proportional to the frequency of the output from the multivibrator 5, while if the frequency is constant, the output is proportional to the amplitude.

The output produced by the integrating circuit 6 is amplified by an amplifier 7 and then applied to a first comparing circuit 8 which, preferably comprises a Schmitt circuit. The circuit 8 has an operating voltage which is set beforehand to a lower level than the output voltage produced by the amplifier 7 when a vehicle has been detected. Suppose that the operating voltage of the circuit 8 is set to a level VI in FIG. 2D, the circuit 8 produces a single vehicle indication output S1 when the output from the amplifier 7 exceeds the level VI.

The output from the comparing circuit 8 is also applied to a differentiator 9, the output from which has a waveform as shown in FIG. 2F. The differentiated output pulse sets a flip-flop 10, which produces an output whose waveform is shown in FIG. 2G. This set output is applied as one input to an AND element 11, the signal S1 being directly applied to the AND element as the other input. Consequently, when the signal S1 is produced, the AND element 11 produces an output as shown in FIG. 2H. This output is applied through a resistor R and a diode D2 to a condenser C2 included in a memorizing circuit 12. As the condenser C2 is charged by the output from the AND element 11, its terminal voltage increases as shown in FIG. 2I. The circuit 12 further includes a transistor Tr1, a field effect transistor Tr2, a condenser C1 and resistors R1 and R2.

Every time the multivibrator 5 applies one pulse to the base of the transistor Tr1, it is rendered conductive, and the output therefrom appears through the condenser C1. Under this condition, with the output from the AND element 11 being applied to the base of the other transistor Tr2, this transistor is also rendered conductive, so that the charged voltage of the condenser C2 appears across the resistor R2. As a result, the terminal voltage of the condenser C1 is the difference between the pulse voltage through the transistor Tr1 and the terminal voltage of the condenser C2. Since the terminal voltage of the condenser C2 increases as time passes as shown in FIG. 2I, the amplitude of the pulses appearing through the condenser C1 becomes smaller and smaller as shown in FIG 2J. These pulses are applied to a second integrating circuit 13, which produces an output voltage corresponding to the frequency and amplitude of the input applied thereto. Since the input pulses applied to the circuit 13 become smaller and smaller in amplitude, its maximum output voltage level reached in each cycle of integration becomes lower and lower as shown in FIG. 2K. The output from the circuit 13 is amplified by an amplifier 14. The amplified voltage is applied to a pair of comparing circuits 15 and 16, both of which may consist of a Schmitt circuit. The operating voltages of both circuits 15 and 16 are used as a reference voltages with which the output from the amplifier 14 is compared. Let it be assumed that the operating voltage of the circuit 15 is set to a level V2, and that the circuit 15 produces an output signal only when the input to the circuit 15 is of a lower level than the level V2. As previously mentioned, the output from the integrating circuit 13 (FIG. 2K) to be applied to the circuit 15 increases as time passes in each cycle of integration, until it has exceeded the level V2, whereupon the output from the circuit disappears. However, the level which the output voltage from the circuit 13 reaches in each succeeding cycle of integration decreases, until it becomes lower than the level V2 again, whereupon the circuit 15 produces an output signal again.

FIGS. 2L and 2N show the outputs from the amplifier 14 and the circuit 15, respectively.

The output from the circuit 15 is applied as a reset input to the flip-flop 10, whereupon the set output from the flip-flop disappears. This removes one of the inputs to the AND element 11, the output from which disappears. As a result, the charged voltage of the condenser C2 is kept at the level reached at that time. Thus, while the first vehicle is being detected by the detecting coil 1, there appears through the condenser C1 pulses of an amplitude corresponding to the difference between the amplitude of the output pulses from the transistor Tr1 and the above mentioned level of the terminal voltage of the condenser C2. Thus, when a first vehicle has been detected, the detection signal S1 is produced and at the same time the detection is memorized as the terminal voltage of the condenser C2.

When the vehicle M1 has gone out of the field of the detecting coil 1 before another vehicle comes in, the output signal S1 from the comparing circuit 8 disappears, that is, its output terminals are grounded, so that the charged voltage of the condenser C2 is instantly discharged through the diode D1 and the grounded terminals of the circuit 8, thereby restoring the original condition of the system.

In the above description, the coil detected a single vehicle. Now will be the time to explain what will happen when two vehicles are detected at the same time. As previously mentioned, when a first vehicle M1 has been detected, the signal S1 is produced and the condenser C2 memorizes the detection of the vehicle M1. Under this condition, that is, while the vehicle M1 is still being detected, if a second vehicle M2 has come into the field of the detecting coil 1, the oscillating frequency of the oscillator 2 is further decreased, so that the output frequency of the mixing circuit 4 becomes higher than before the vehicle M2 was detected, as shown in FIG. 3A. This causes the output frequency of the monostable multivibrator 5 to become higher, so that the pulses appearing through the condenser C1 as shown in FIG. 3B are of the same frequency as that of the output frequency of the multivibrator 5 and of an amplitude corresponding to the amplitude of the output pulses from the multivibrator minus the terminal voltage of the condenser C2. These pulses from the condenser C1 are applied to the integrating circuit 13, the output from which has a waveform as shown in FIG. 3C. This voltage is amplified by the amplifier 14, and the amplified voltage is higher than before. The reference voltage V3 of the comparing circuit 16 is set to such a higher level than the voltage level V2 of the comparing circuit 15 that it is only when two vehicles M1 and M2 are detected at the same time that the reference voltage V3 is exceeded by the output from the amplifier 14. When the voltage V3 is exceeded, the circuit 16 produces an output, which is applied as an input to an INHIBIT element 17. Before this, the flip-flop 10 has already been reset by the output from the circuit 15, so that the inhibit input to the element 17 has already been removed. As a result, the INHIBIT element 17 produces a second vehicle indication output S2 as shown in FIG. 3E, indicating that two vehicles M1 and M2 have been simultaneously detected.

When the two vehicles go out of the field of the coil 1, both signals S1 and S2 disappear, so that the original condition of the system is restored.

If desired, three or more vehicles can be detected at the same time, provided that the coil 1 be of such a dimension as to extend across three or more lanes of the street, and that still another comparing circuit which is similar to the circuit 16 but has a reference voltage higher than the level V3, and another INHIBIT element similar to the element 17 be added to the system of FIG. 1.

Thus, in accordance with the invention, while a first vehicle is being detected, the detection of a second vehicle is not by means of the change itself in the output of the detecting element having additionally detected the second vehicle, but by the change in the difference between that output and the output memorized when a first vehicle was detected. Therefore, even when the vehicles are of different sizes so that the electrical quantity of the output from the detecting element when a single vehicle has been detected is the same as when two or more vehicles of smaller sizes have been detected, the detection of the number of vehicles can be effected without fail.

Figure 4:
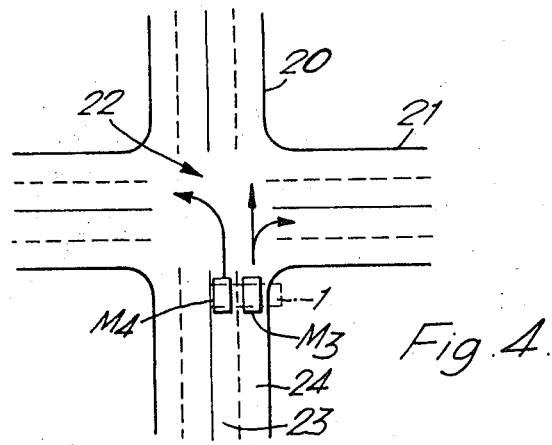
FIG. 4 is a schematic top plan view of a street intersection in which the system of the invention is employed to detect left turn vehicles separately from straight through and/or right turn vehicles.

The invention may also be utilized to detect at a street intersection left turn traffic separately from straight through and/or right turn traffic. FIG. 4 shows an intersection 22 at which two streets 20 and 21 cross each other. A vehicle M3 which intends to go straight through the intersection must be on the right-hand lane 24 of the street 20 and a vehicle M4 intending to make a left turn, on the left-hand lane 23. A detecting element 1 is placed across the two lanes. Suppose that the traffic signal control at the intersection is conducted in two-phase system so that on one phase straight through and right turn traffic is permitted to move and on the other phase left turn traffic is permitted to move. During the former phase, the left turn vehicle M4 stops on the detecting coil 1, while on the other lane 24 straight through and/or right turn vehicles successively pass over the coil 1. Consequently, the signal s1 continues due to the vehicle M4 stopping on the coil 1, while the signal S2 repeatedly appears every time a vehicle M3 passes the coil 1. Therefore, if the signal S1 alone continues for a predetermined period of time without the signal S2, it means that there is no straight through or right turn vehicle in front of the intersection. Then the traffic signal may be changed from the first to the second phase on which the waiting left turn vehicle M4 is permitted to proceed. Thus, the single detecting element 1 can detect the vehicles on the two lanes separately.

Having illustrated and described some preferred embodiments of the invention, it is understood that they are merely representative and that there are many changes and modifications thereof within the scope of the invention as described in the appended claims.

What we claim is:

1. Apparatus for detecting vehicles on a street having a plurality of lanes, comprising:
   1. a vehicle detecting element extending across a plurality of said lanes and sensitive to presence of vehicles therein in proximity with said element;
   2. detection circuit means coupled to said element and operable to produce a first detection signal in response to presence of a vehicle in either of said lanes and a second detection signal in response to simultaneous presence of vehicles in two of said lanes;
   3. a first indicator circuit responsive to said detection circuit means for providing a first vehicle indication output in response to said first detection signal;
   4. storage means responsive to said first indicator circuit for storing said first vehicle indication output;
   5. difference circuit means responsive to said detection circuit means and said storage means for providing a signal representing the difference between the detection signal provided by said detection circuit means and the stored first vehicle indication output; and
   6. a second indicator circuit for comparing said difference signal with a reference value to produce a second vehicle indication output in response to a difference signal value indicating simultaneous presence of vehicles in said two lanes in proximity with said element.

2. The apparatus of claim 1, wherein said detection circuit means includes an oscillator and said detecting element comprises an inductance coil constituting a component of said oscillator.

3. The apparatus of claim 1, wherein said detection circuit means includes a first oscillator the oscillating condition of which is adapted to be changed by the presence of a vehicle within the field of said detecting element, a second oscillator providing a reference output frequency, and means for comparing said two frequencies to produce pulses of a frequency corresponding to the difference between said two frequencies.

4. The apparatus of claim 1, further including means coupled with said storage means and said detection circuit means for cancelling the stored first vehicle indication upon departure of said first vehicle from proximity with said element prior to arrival of a second vehicle.

5. The apparatus of claim 1, wherein said first indicator circuit includes means for comparing said first detection signal with a predetermined value to derive said single vehicle indication output.